C. Peillard,
Horseshoe.

No. 95,133.                    Patented Sep. 21. 1869.

Witnesses:                     Inventor:
C. H. Pettit                   Chas. Peillard
A. M. Panner                   by Munn & Co.
                               Attorneys.

United States Patent Office.

CHARLES PEILLARD, OF FRANCE.

Letters Patent No. 95,133, dated September 21, 1869.

---

IMPROVEMENT IN HORSESHOES.

---

The Schedule referred to in these Letters Patent and making part of the same.

---

*To all whom it may concern:*

Be it known that I, CHARLES PEILLARD, of the Empire of France, have invented a new and useful Improvement in Horseshoes; and I do hereby declare that the following is a full, clear, and exact description of the construction and operation of the same, reference being had to the accompanying drawings, making a part of this specification, in which—

Figure 1:
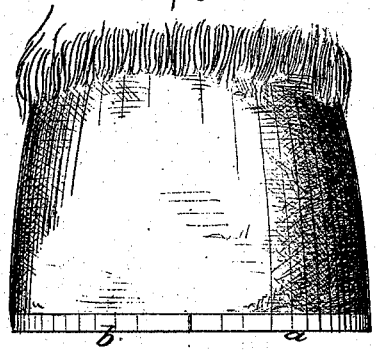
Figure 1 is a front elevation.
Figure 2:
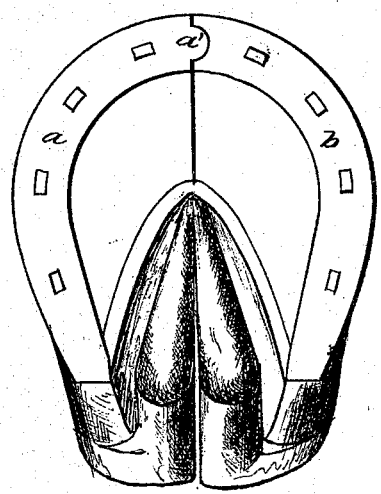
Figure 2 is a plan view of the shoe inverted.

This invention consists in dividing a horseshoe in two parts of equal length, the division taking place at the middle, and the line of section being partly straight and partly circular, so as to form at the extremity of one branch, a curved projection, and at the adjacent extremity of the other branch, a depression of corresponding shape, by which the two branches are connected when nailed upon the hoof, without a hinge.

In the drawings—

*a b* represent the two branches of my horseshoe, the part *a* having, at its front end, a curved projection, *a'*, and the part *b* having at its front end, a curved recess of corresponding shape.

When the two parts are nailed upon the hoof, they are, by this construction, pivoted together without any pin, that is to say, they have all the yieldingness of a hinge, without any of its rigidity.

The object of this arrangement is to allow the hoof to expand as it naturally does under the weight of the animal, and as it is prevented from doing when a rigid shoe is employed. Diseases of various sorts are caused by this violation of the laws of nature, all which are prevented by my arrangement. Its use renders the horse more nimble and confident in his movements. It also requires resetting less often than the ordinary shoe, because there is no lateral strain brought upon the nails by the hoof.

The tongue-and-groove form is adopted in order to give to each branch the support of the other against frontal impact.

Having thus described my invention,

What I claim as new, and desire to secure by Letters Patent, is—

The horseshoe herein described, consisting of the two parts *a b* of equal length, the one having a circular projection, *a'*, fitting a corresponding recess in the other, thereby forming a joint at the toe, as and for the purpose set forth.

CHAS. PEILLARD.

Witnesses:
   F. OLCOTT,
   J. U. ZUST.